R. B. FAGEOL.
AUTOMOBILE BUMPER.
APPLICATION FILED APR. 13, 1912.

1,205,608.

Patented Nov. 21, 1916.
2 SHEETS—SHEET 1.

WITNESSES
R. Schleicher
G. P. Sharkey

INVENTOR
Rollie B. Fageol,
BY
ATTORNEY

R. B. FAGEOL.
AUTOMOBILE BUMPER.
APPLICATION FILED APR. 13, 1912.
1,205,608.
Patented Nov. 21, 1916.
2 SHEETS—SHEET 2.
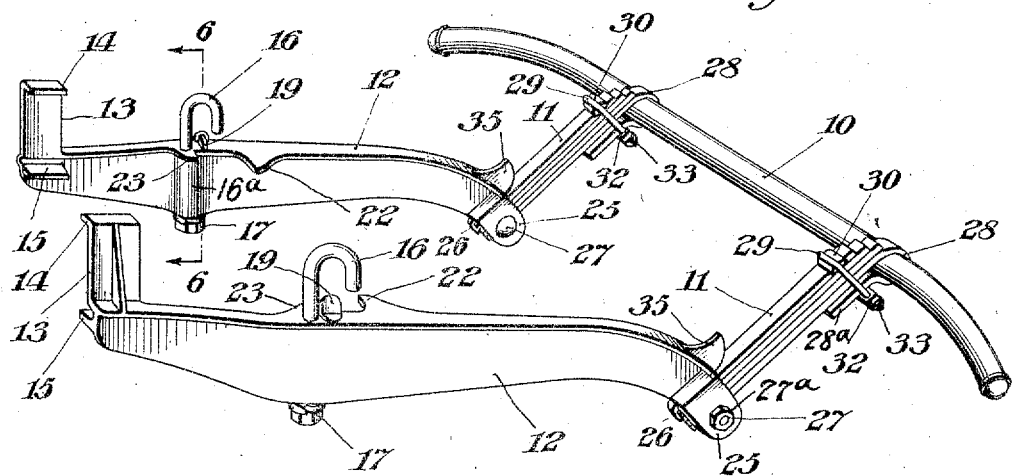
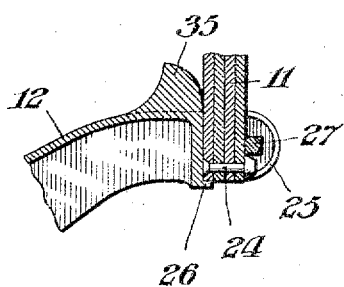
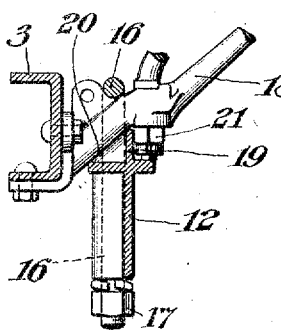
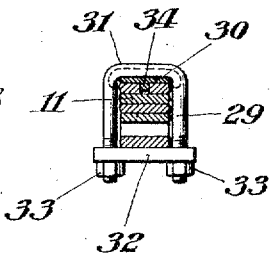
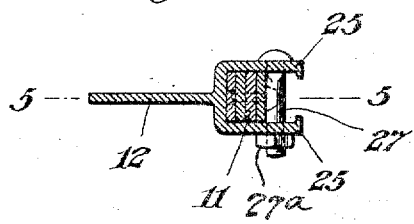
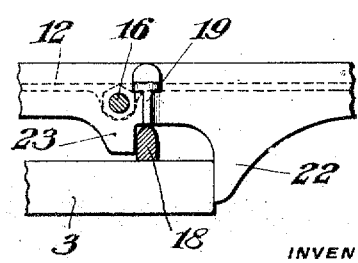
WITNESSES
R. Schleicher
G. P. Sharkey
INVENTOR
Rollie B. Fageol,
BY
ATTORNEY

UNITED STATES PATENT OFFICE.

ROLLIE B. FAGEOL, OF PHILADELPHIA, PENNSYLVANIA.

AUTOMOBILE-BUMPER.

1,205,608.　　　　Specification of Letters Patent.　　Patented Nov. 21, 1916.

Application filed April 13, 1912.　Serial No. 690,600.

*To all whom it may concern:*

Be it known that I, ROLLIE B. FAGEOL, a citizen of the United States, residing at Philadelphia, in the county of Philadelphia and State of Pennsylvania, have invented certain new and useful Improvements in Automobile-Bumpers, of which the following is a specification.

This invention relates to automobile bumpers.

The principal object of my invention is to provide a strong and durable bumper structure which may be applied to an automobile in which the forward end of the frame terminates a considerable distance back of the position occupied by the bumper bar.

A further object of the invention is to provide various novel features of construction applicable to bumpers for all types of automobiles and in which simplicity of construction is combined with efficiency of operation, all of which will be hereinafter fully described and particularly pointed out in the claims.

My invention further contemplates the provision of a bumper or buffer which may be easily and quickly attached to a vehicle without the necessity of drilling or otherwise subjecting the parts thereof to which it is applied to alteration or change of any description, and which, when so attached, will possess as great stability as an integral part of the vehicle.

While my invention is applicable to automobiles or other vehicles of any type wherein it is desired to provide means for absorbing or taking up the shock incident to collision with another moving or stationary object and also to prevent injury to such various parts of the vehicle, as are of light construction and consequently easily broken or damaged, it is especially adaptable to automobiles in which the forward end of the frame or chassis does not extend or project beyond the front or forward axle of the vehicle and for which particular type of vehicle it has heretofore been impossible to obtain an effective and durable bumper.

Various other advantages of structure and the operation of my invention will be apparent from the following full description taken in conjunction with the accompanying drawings, the essential elements of novelty therein being thereafter more particularly set forth in the annexed claims.

Figure 1:
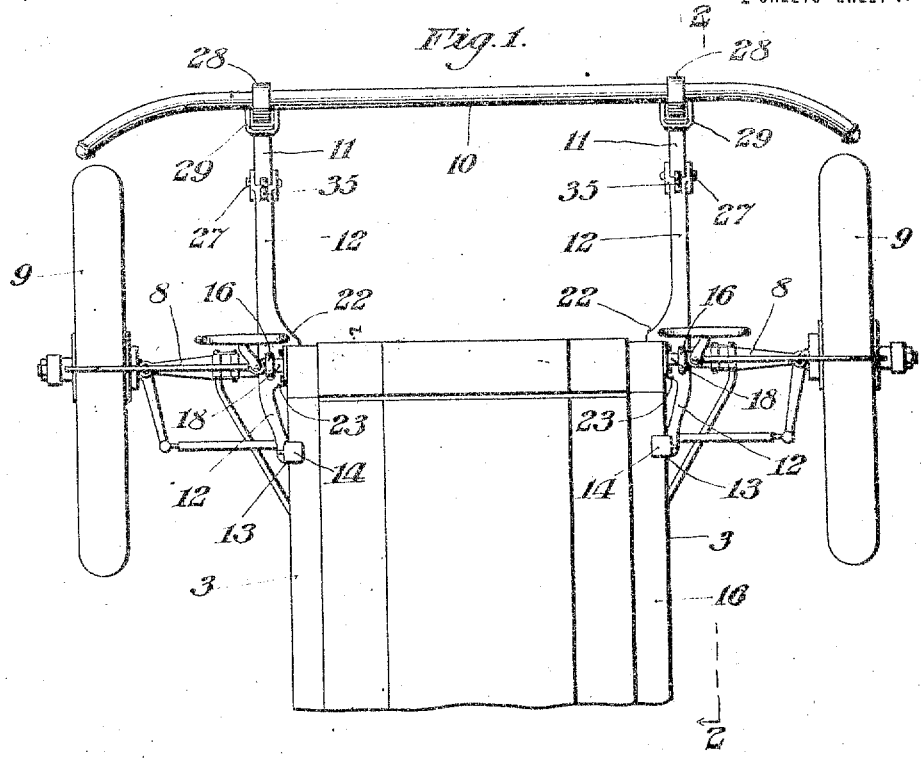
Figure 2:
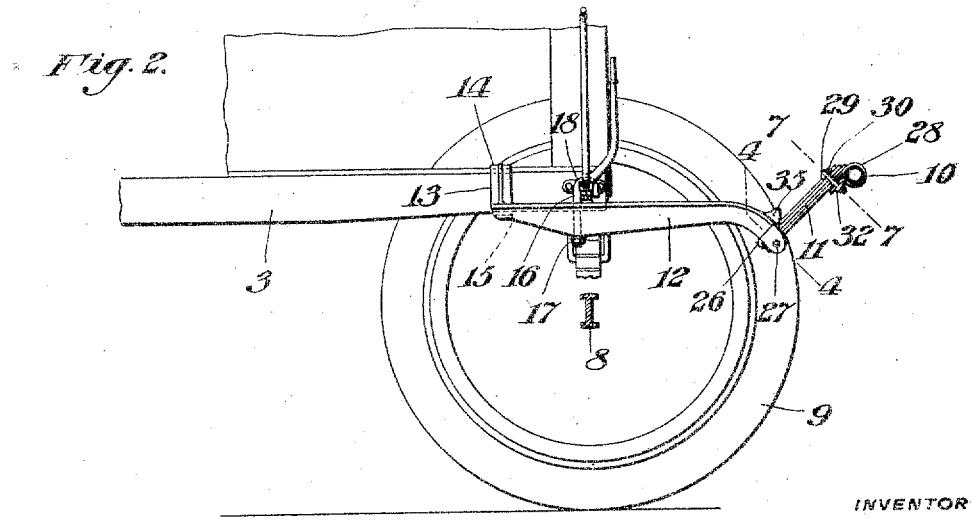

In the accompanying drawings, illustrating my invention: Figure 1 is a plan view of a portion of the front end of an automobile and my improved bumper attached thereto. Fig. 2 is a section, on line 2—2 of Fig. 1, parts of the automobile being broken away. Fig. 3 is a perspective view of the bumper structure detached from the automobile. Fig. 4 is a section on line 4—4 of Fig. 2, showing the clamping means for one of the springs. Fig. 5 is a section of the clamping means shown in Fig. 4, on line 5—5 of Fig. 4. Fig. 6 is a section on line 6—6 of Fig. 3, including parts of the automobile structure. Fig. 7 is a section on line 7—7 of Fig. 2. Fig. 8, is a plan view of the forward end of one of the side bars of the automobile frame and the adjacent portion of the extension bar, showing the hook bolt and the bracket on the side bar in section.

Referring to the drawings, 3 designates the two horizontal side bars of the automobile frame, 8 the forward axle and 9 the forward supporting or carrying wheels. The side bars 3 extend longitudinally of the automobile and the forward ends thereof are connected together by a transverse bar and are supported by a suitable spring or springs which in turn are supported by the axle 8 in the usual manner.

The bumper bar 10 is arranged to extend horizontally and transversely across the front of the automobile, the central portion of the bar being straight and the end portions thereof being curved rearwardly, as shown. The bumper bar 10 is supported by springs 11 carried by extension bars 12 which are secured to the side bars 3 of the automobile frame, as will be hereinafter described.

For securing my improved bumper to the vehicle so that it will prove effective in operation, and to produce a device which will withstand severe shock and may be quickly and easily attached without subjecting the vehicle to any alteration, I employ a pair of auxiliary or extension bars 12, one being secured to one side bar 3 and the other being secured to the other side bar 3, and two springs 10 are provided, one being carried by one extension bar 12 and supporting one end of a bumper bar 10, and the other being carried by the other extension bar 12 and supporting the other end of the bumper bar 10. These springs 11 and extension bars 12 and the manner of attaching the bars 12 to the springs 11 and the side bars 3, and the manner of attaching the springs 11 to the bumper bar 10 are alike in every particular excepting that the extension bars are made right and left, as shown, to engage opposite parts of the side bars 3. Therefore, the following description of one spring 11 and one bar 12 will suffice for both.

The extension bar 12 is preferably of the configuration shown, having its forward extremity curved slightly downward and is adapted to be positioned against and secured to the side bar 3 of the vehicle with its forward portion projecting therebeyond, as shown in Fig. 2. Preferably formed integral with the extension bar at its rear end is an upwardly directed jaw piece 13 having upper and lower inwardly extending flanges 14 and 15 which are adapted to respectively bear upon the upper and lower surfaces of the side bar, and prevent movement of the extension bar in a vertical direction, as and for the purposes which will hereinafter be apparent.

Spaced from the jaw 13, in advance thereof is a hook bolt 16 which is positioned within the socket 16ª in the extension bar 12 and has a nut 17 screwed on to the lower end thereof beneath the extension bar. The upper end of the bolt 16 is adapted to hook over and engage a bracket 18 secured to and extending outwardly from the adjacent side bar 3. In the construction shown in the drawings, the bracket 18 forms a support for a lamp and also for a mud guard for the adjacent carrying wheel 9. The top of the bolt 16 rests in a depression in the top of the bracket, and the top of the extension bar 12 is provided with an upwardly-extending projection 19 having an inclined upper face resting against an inclined bottom wall 20 of the bracket 18 and having an outer wall resting against a nut 21 on the bottom of the bracket 18, the projection 19 being held in place between the wall 20 and nut 21. It will thus be seen that when the nut 17 is tightened, the extension bar 12 will be firmly clamped to the bracket 18, effectively preventing vertical or lateral movement thereof.

To prevent longitudinal movement or slippage of the extension bar 12 under the force of an impact delivered to the buffer bar 10 and communicated thereto by the supporting springs 11, I provide an inwardly extending abutment 22 arranged adjacent the forward end of the side bar 3 and adapted to engage the same so that the side bar will take the rearward thrusts against the extension bar. The extension bar 12 is also provided with an inwardly-extending projection 23 positioned rearwardly of the abutment 22 and slightly forward of the socket 16ª which is adapted to engage the side of the bracket 18 and assist in setting the bar 12 into proper position in assembling the parts and also to prevent forward displacement of the extension bar relative to the side bar.

The extension bar 12 extends some distance forwardly of the forward end of the adjacent side bar 3 and forms, in effect, a forward continuation thereof. The forward portion of the bar 12 is curved downwardly, as shown, and the forward end of the bar 12 is split to provide a jaw 25 for the reception of the lower end of the spring 11 which extends forwardly and upwardly therefrom. The spring 11 is of the laminated type formed of a plurality of leaf sections which lie in engagement with each other, as shown. The lower ends of the leaf sections are secured together by a rivet 24 extending therethrough and having a projecting head 24ª on its forward end. The lower end of the spring rests between the side walls of the jaw 25 of the bar 12 and upon a projection 26 forming an abutment, to prevent the spring from being forced downwardly through the jaw upon the buffer bar receiving a downward or backward thrust. The sides of the jaw 25 are drawn toward each other by a bolt 27 having a securing nut 27ª extending therethrough to clamp the spring therein. The bolt 27 is arranged directly above the head on the rivet 24 to engage the same and prevent upward displacement of the spring relative to the bar 12.

The upper end of the forward leaf section of the spring 11 is bent to form a loop 28 which embraces and engages the bumper bar 10. The upper ends of the other leaf sections terminate short of each other providing a series of graduations, all of the leaves or sections being held in frictional engagement, as shown. The walls of the loop 28 are drawn together to clamp the bar 10 by a yoke clamp 29 which embraces the sides of the loop 28 and the adjacent ends of the other leaf sections forming the spring. The rearward leaf section is engaged by a shoe 30 which in turn is engaged by the rearward member 31 of the yoke clamp 29. The side members of the yoke clamp 29 extend forwardly from the member 31 and inclose the leaf sections of the spring and extend through openings in a cross bar 32 which is engaged with the forward face of the loop 28. The forward ends of the side members of the yoke clamp 29 are screw-threaded for the reception of nuts 33 which may be screwed against the bar 32, thereby causing the yoke clamp 29 to draw the walls of the loop 28 together and clamp the bar 10 to the spring. The shoe 30 is provided with a projection 34 which extends into an opening in the rearward leaf section of the spring and prevents longitudinal movement of the leaf section relative to the shoe.

Extending upwardly from the extension 12 directly back of the lower portion of the spring 11 is an abutment 35 for the spring. The forward face of the abutment is curved and gradually spaced from the spring, as shown, so that as the upper end of the spring is forced back, the lower portion of the spring will engage and roll against the abutment 35.

Should the bumper bar 10 encounter an object and be forced rearwardly, the leaf sections of the spring 11 will yield, the upper ends of the sections sliding through the yoke clamp 29 and increasing their power of resistance as they are forced back. As the upper ends of the leaf sections are forced back they slide upwardly upon each other, thereby raising the shoe 34 with relation to the bar 32 and increasing the friction between the leaf sections at the upper end of the spring, thus further increasing the power of resistance of the spring 11 as it is forced back. The rivet 24 prevents relative movement of the leaf sections at the bottom of the spring when the tops of the leaf sections are caused to slide upon each other as they are forced back.

Normally the central portion of the bumper bar 10 maintains the jaws 13 rigidly in engagement with the side bars 8 by bracing the forward ends of the extension bars against movement toward each other. However, should the bar 10 strike or be struck by an object and bent between the springs 11 thereby forcing the springs and the forward ends of the extension bars 12 toward each other, the jaws 13, having open inner sides, will permit the rearward ends of the extension bars to be sprung outwardly without serious injury to the various parts of the structure.

I claim:

1. A means for supporting an automobile bumper transversely of the vehicle, comprising a bracket having a portion adapted to project outwardly from the vehicle to support the bumper and a laterally-directed portion adapted to abut against a transverse portion of the frame of the vehicle to prevent longitudinal movement of the bracket under pressure applied thereto.

2. The combination with the frame of an automobile, of a bumper, and means for connecting said bumper to said frame, said means comprising a bracket having a portion adapted to project forwardly from the front end of the vehicle and a laterally-directed portion adapted to abut against a transverse portion of the automobile to prevent movement of the bracket in a longitudinal direction, means for securing said bracket against movement in a lateral direction and means for fastening the bumper to the projecting portion of said bracket.

3. In combination with the frame of an automobile, a bumper, and means for positioning the bumper bar in advance of the frame, said means comprising a bracket having a forwardly-directed portion extending beyond the plane of the forward end of the automobile frame and a laterally-extending portion adapted to abut against a transverse portion of the automobile frame, means for securing the bumper to said forwardly-directed portion of the bracket, means for fastening said laterally-directed portion to the automobile frame and means carried by said bracket for engagement with a part of the automobile separate from the frame, whereby said bracket will be rigidly held against movement in any direction.

4. In combination with the frame of an automobile, a bumper extending transversely and forwardly thereof, and means for connecting said bumper to said frame, said means comprising an arm adapted to extend forwardly of the automobile frame substantially in alinement with a longitudinal member thereof, means carried by said arm to secure said arm against movement in a perpendicular plane and means formed integral with said arm and lying in a plane at right angles to the plane of said arm adapted to engage a transverse portion of said frame to secure said arm against longitudinal movement upon the application of pressure to said bumper.

5. The combination with the longitudinally-extending side bars of an automobile frame, of a transversely-extending bumper bar, means connecting said bumper bar to one of said side bars, an extension bar adjacent the other of said side bars and extending forwardly from the forward end thereof, said extension bar having a part extending over and a part extending under one portion of the adjacent side bar, a bracket extending from another portion of said adjacent side bar, means for securing said extension bar to said bracket, and means for connecting said bumper bar to the forward part of said extension bar.

6. The combination with the longitudinally-extending side bars of an automobile frame, of a transversely-extending bumper bar, means connecting said bumper bar to one of said side bars, an extension bar adjacent the other of said side bars and extending forwardly from the forward end thereof and having an abutment engaging a part of the adjacent side bar and preventing rearward movement of the extension bar, said extension bar having a part extending over and a part extending under one portion of the adjacent side bar, a bracket extending from another portion of said adjacent side bar, means for securing said extension bar to said bracket, and means for connecting said bumper bar to the forward part of said extension bar.

7. The combination with the longitudinally-extending side bars of an automobile frame, of a transversely-extending bumper bar, means connecting said bumper bar to one of said side bars, an extension bar adjacent the other of said side bars and extending forwardly from the forward end thereof, said extension bar having a part extending over and a part extending under one portion of the adjacent side bar, a bracket extending from another portion of said adjacent side bar, a U-bolt embracing said bracket and extending through said extension bar and securing it to said bracket, and means for connecting said bumper bar to the forward part of said extension bar.

8. The combination with the longitudinally extending side bars of an automobile frame, of a transversely-extending bumper bar, means connecting said bumper bar to one of said side bars, an extension bar secured to the other of said side bars and extending forwardly from the forward end thereof, and a spring extending forwardly and upwardly from the forward end of said extension bar and having its upper end connected to said bumper bar and its lower end connected to the forward end of said extension bar.

9. The combination with the longitudinally-extending side bars of an automobile frame, of a transversely-extending bumper bar, means connecting said bumper bar to one of said side bars, an extension bar secured to the other of said side bars and extending forwardly from the forward end thereof, a spring extending forwardly and upwardly from the forward end of said extension bar and having its upper end connected to said bumper bar and its lower end connected to the forward end of said extension bar, said spring being formed of a plurality of leaf sections engaged with each other and free to slide against each other at one portion of the spring, and means for securing said sections together at another portion of the spring.

10. In a bumper for automobiles, the combination of a buffer bar, means for supporting said buffer bar in a horizontal plane forwardly of the automobile, said means embodying a plurality of frictionally engaged leaves and means connected to said supporting means for securing said supporting means to the automobile, said latter means projecting beyond the frame of the automobile and forming an extension thereof.

11. The combination with the longitudinally-extending side bars of an automobile frame, of a transversely-extending bumper bar, means connecting said bumper bar to one of said side bars, an extension bar secured to the other of said side bars and having a split end, a spring within the split end and extending therefrom and connected to said bumper bar, and means for drawing the sides of said split end together to clamp the spring therein.

12. The combination with the longitudinally-extending side bars of an automobile frame, of a transversely-extending bumper bar, means connecting said bumper bar to one of said side bars, an extension bar secured to the other of said side bars and having a split end, a spring within the split end and extending therefrom and connected to said bumper bar, said extension bar having an abutment engaging the bottom of said spring and preventing downward displacement thereof, and means for drawing the sides of said split end together to clamp the spring therein.

13. The combination with the longitudinally-extending side bars of an automobile frame, of a transversely-extending bumper bar, means connecting said bumper bar to one of said side bars, an extension bar secured to the other of said side bars and having a split end, a spring within the split end and extending therefrom and connected to said bumper bar, said spring comprising a plurality of leaf sections held together by a rivet having a projecting head, and a bolt connecting the sides of said split end and clamping the spring therein, said bolt engaging the head of the rivet and preventing upward displacement of the spring.

14. The combination with the longitudinally-extending side bars of an automobile frame, of a transversely-extending bumper bar, means connecting said bumper bar to one of said side bars, an extension bar secured to the other of said side bars, and a spring secured to said extension bar and extending forwardly therefrom and connected to said bumper bar, said extension bar being provided with an abutment face for said spring, said abutment face being gradually spaced from said spring.

15. In a bumper for automobiles, a buffer bar, yielding supports therefor, consisting of a plurality of frictionally engaged leaves and means in engagement with said yielding supports below the horizontal plane of said buffer bar and adapted to position said supports and said buffer bar forwardly of the automobile, said means extending forwardly from the frame of the automobile and forming an extension thereof.

16. In combination with an automobile frame, a bumper bar arranged to be supported transversely and forwardly thereof, and means for attaching said bumper bar to said frame, said means embodying an arm adapted to be positioned on each of the sides of said frame, means carried by said arm for engagement with a portion of the automobile to rigidly secure said arm against vertical and lateral movement, and a laterally-directed abutment formed integral with each of said arms and adapted to engage a transverse portion of said frame to secure said arms against longitudinal movement; and means for yieldingly attaching said bumper bar to said supporting means.

17. In combination with the frame of an automobile, a buffer bar extending transversely and forwardly thereof and means for attaching said buffer bar to said frame, said means consisting of arms arranged to form extensions of the side bars of said frame, means for rigidly securing said arms to said side bars against vertical and lateral movement, each of said arms having a laterally-directed portion arranged to engage with a transversely extending portion of said frame to prevent longitudinal movement of said arm relatively to said frame, and means for yieldingly mounting said buffer bar on said arms.

18. In combination with a motor vehicle frame, having a pair of longitudinal members, and transversely-extending members connecting said longitudinal members, the forward transverse member being in engagement with the forward ends of the longitudinal members, a bumper and means for supporting the bumper forwardly of the motor vehicle frame, said means comprising a bracket having a portion adapted to project outwardly from the front of the frame to effect substantially a continuation of the longitudinal frame member and a lateral portion adapted to abut against a transverse portion of the frame, and means for securing said bracket to said motor vehicle frame.

In testimony whereof I affix my signature in presence of two witnesses.

ROLLIE B. FAGEOL.

Witnesses:
A. V. GROUPE,
S. I. HARPER.